(12) United States Patent
Krone et al.

(10) Patent No.: US 9,730,424 B2
(45) Date of Patent: Aug. 15, 2017

(54) SPACE DIVIDER OF A MILKING PARLOR ARRANGEMENT, AND MILKING PARLOR ARRANGEMENT

(71) Applicant: GEA Farm Technologies GmbH, Bönen (DE)

(72) Inventors: Otto Krone, Ibbenbüren (DE); Derk Hensel, Jessen (DE); Armin Hönscheid, Bönen (DE); Dieter Hille, Oelde (DE); Erich Schneider, Ahlen (DE); Marc Trossehl, Werne (DE); Thomas Mader, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 381 days.

(21) Appl. No.: 14/384,676

(22) PCT Filed: Mar. 14, 2013

(86) PCT No.: PCT/EP2013/055272
§ 371 (c)(1),
(2) Date: Sep. 12, 2014

(87) PCT Pub. No.: WO2013/135833
PCT Pub. Date: Sep. 19, 2013

(65) Prior Publication Data
US 2015/0296737 A1 Oct. 22, 2015

(30) Foreign Application Priority Data

Mar. 14, 2012 (DE) .................. 10 2012 102 132
Nov. 2, 2012 (DE) .................. 10 2012 110 502

(51) Int. Cl.
*A01J 5/00* (2006.01)
*A01J 7/04* (2006.01)
(Continued)

(52) U.S. Cl.
CPC ............... *A01J 5/041* (2013.01); *A01J 5/007* (2013.01); *A01J 5/017* (2013.01); *A01J 5/0175* (2013.01);
(Continued)

(58) Field of Classification Search
CPC .... A01J 5/00; A01J 5/003; A01J 5/017; A01J 5/0175
(Continued)

(56) References Cited

U.S. PATENT DOCUMENTS 2,357,373 A 9/1944 Anderson
4,508,058 A 4/1985 Jakobson et al.
(Continued)

FOREIGN PATENT DOCUMENTS

DE 29522237 12/2000
EP 0734649 A2 10/1996
(Continued)

OTHER PUBLICATIONS

International Search Report for corresponding International Application No. PCT/EP2013/055272 dated Mar. 14, 2013.
(Continued)

*Primary Examiner* — Yvonne Abbot-Lewis
(74) *Attorney, Agent, or Firm* — Smith Law Office; Jeffry W. Smith

(57) ABSTRACT

A space divider (4) of a milking parlor arrangement for at least one milking parlor (3) for milking milk-producing animals (T), wherein the space divider (4) is arranged approximately parallel to a longitudinal axis of the animal (T) to be milked, has an arm device (6) having a milking cluster (5, 5'), which can be adjusted from a parking position to a working position and back. The arm device (6) is arranged with the milking cluster (5) in the parking position in the space divider (4), wherein the milking cluster (5, 5')
(Continued)

can be adjusted into the working position laterally to the animal (T) to be milked between the front and rear legs thereof. The milking cluster (5, 5') comprises two halves, wherein each half has a specific set of at least one teatcup (5a). The space divider (4) is designed in such a way that no additional space is required between adjacent animals (T), so that many animals (T) can be milked in a milking parlor arrangement (1, 1', 1") while the smallest possible amount of space is required. A milking parlor arrangement (1, 1', 1") has at least one external robot (12).

12 Claims, 10 Drawing Sheets

(51) Int. Cl.
- *A01J 5/04* (2006.01)
- *A01K 1/12* (2006.01)
- *A01J 5/017* (2006.01)
- *A01J 7/02* (2006.01)
- *A01J 5/007* (2006.01)

(52) U.S. Cl.
CPC .................. *A01J 7/02* (2013.01); *A01J 7/025* (2013.01); *A01K 1/12* (2013.01); *A01K 1/123* (2013.01); *A01K 1/126* (2013.01)

(58) Field of Classification Search
USPC .......... 119/14.01, 14.03, 14.04, 14.08, 14.18
See application file for complete search history.

(56) References Cited

U.S. PATENT DOCUMENTS

| | | | |
|---|---|---|---|
| 4,838,207 A | 6/1989 | Bom et al. | |
| 5,042,428 A | 8/1991 | van der Lely et al. | |
| 5,056,466 A | 10/1991 | Dessing et al. | |
| 5,383,423 A | 1/1995 | van der Lely | |
| 5,595,945 A | 1/1997 | Wicks | |
| 5,596,945 A * | 1/1997 | van der Lely | A01J 5/0175 119/14.03 |
| 5,606,932 A | 3/1997 | van der Lely | |
| 5,678,506 A | 10/1997 | van der Berg | |
| 5,697,324 A * | 12/1997 | van der Lely | A01J 5/007 119/14.08 |
| 5,784,994 A | 7/1998 | van der Lely | |
| 5,862,776 A | 1/1999 | van den Berg | |
| 5,918,566 A | 7/1999 | van den Berg | |
| 6,050,219 A | 4/2000 | van der Lely | |
| 6,116,188 A * | 9/2000 | van der Lely | A01J 5/0175 119/14.02 |
| 6,213,051 B1 * | 4/2001 | Fransen | A01J 7/02 119/14.01 |
| 6,244,215 B1 | 6/2001 | Oosterling | |
| 6,279,507 B1 * | 8/2001 | van der Lely | A01J 5/0175 119/14.01 |
| 6,382,130 B1 | 5/2002 | Rooney | |
| 6,814,027 B2 * | 11/2004 | Hein | A01K 1/123 119/14.03 |
| 7,104,218 B2 | 9/2006 | Teckentrup et al. | |
| 8,015,941 B2 | 9/2011 | Hallström | |
| 8,646,412 B2 | 2/2014 | Eriksson | |
| 2002/0002953 A1 | 1/2002 | van der Lely et al. | |
| 2004/0050331 A1 | 3/2004 | Hein et al. | |
| 2011/0061596 A1 | 3/2011 | Nilsson | |
| 2013/0112142 A1 | 5/2013 | Harty et al. | |
| 2015/0020738 A1 | 1/2015 | Krone et al. | |
| 2015/0020739 A1 | 1/2015 | Krone et al. | |

FOREIGN PATENT DOCUMENTS

| | | |
|---|---|---|
| EP | 0736246 A1 | 10/1996 |
| EP | 0657097 | 2/2002 |
| RU | 2244417 C2 | 1/2005 |
| RU | 2279796 C2 | 7/2006 |
| WO | 93/13651 A1 | 7/1993 |
| WO | WO9601041 | 1/1996 |
| WO | 01/67852 A1 | 9/2001 |
| WO | WO2008118068 | 10/2008 |
| WO | 2010/052156 A1 | 5/2010 |
| WO | 2011/098454 | 8/2011 |

OTHER PUBLICATIONS

International Search Report and Written Opinion for International Application No. PCT/EP2013/055265 mailed May 27, 2013, 7 pages.

International Search Report and Written Opinion for International Application No. PCT/EP2013/055288 mailed May 24, 2013, 9 pages.

* cited by examiner

SPACE DIVIDER OF A MILKING PARLOR ARRANGEMENT, AND MILKING PARLOR ARRANGEMENT

The invention relates to a space divider of a milking parlor arrangement according to the preamble of claim 1. The invention also relates to a milking parlor arrangement.

A milking parlor arrangement of this type is used to milk milk-producing animals mechanically. Milk-producing animals are, for example, cows, goats, sheep etc. The milking parlor arrangement comprises milking parlors which are separated by space dividers. The milking operation can be automated by means of so-called milking robots. Rotary milking parlors, for example, are in use.

The term milking parlor arrangement refers to arrangements of milking parlors, an angular position of an animal to be milked or an angular position of an imaginary longitudinal axis of an animal to be milked in a milking parlor with respect to a reference point or to a reference line being able to be between 0° and 90°. A pit or an area, which is accessible by staff (e.g. working process) and which is the place occupied by the milking staff, is used, for example, as a reference point. The longitudinal side of a straight pit or a tangent of a circular pit is used as a reference line.

Milking parlor arrangements are, for example, movable and non-movable milking parlor arrangements. Movable milking parlor arrangements are, for example, rotary milking parlors as external rotaries and internal rotaries, both types with arbitrary direction of rotation. So-called side-by-side milking parlors can also be realized as movable milking parlor arrangements. In addition, group milking parlors are also non-movable, such as, for example, herringbone milking parlors and tandem milking parlors. This listing is only as an example and is not limiting.

EP 1 084 611 B1 describes a robot arm structure with a pivotable carrier unit for a milking cluster. The structure is movable on one or several rails along one or several milking boxes.

Existing automation technology is not suitable or is only suitable in a limited manner for large installations as a result of a low throughput in milked cows/animals per hour. The ever more stringent requirements in particular for high throughput figures and continuous operation necessitate, in the case of modern milking robots which are complex and expensive, common use of several milking parlors. This can work out disadvantageously, among other things as a result of greater complexity and resultant higher default probability, discontinuous operation, areas blocked to the staff (safety in the robot area).

Against said background, the object of the invention is to provide an improved arrangement as well as a milking parlor and to improve the possible installation throughput.

Said object is achieved by a space divider with the features of claim 1 and by a milking parlor arrangement with the features of claim 10.

A space divider according to the invention of a milking parlor arrangement for at least one milking parlor for milking milk-producing animals, wherein the space divider is arranged approximately parallel to a longitudinal axis of the animal to be milked, comprises an arm device with a milking cluster which is adjustable out of a park position into an operating position and back. The arm device with the milking cluster is arranged in the space divider in the park position, wherein the milking cluster is adjustable into the operating position laterally with respect to the animal to be milked between the front and hind legs thereof, and wherein the milking cluster consists of two halves, wherein each half comprises a specific set of at least one teat cup.

A further space divider according to the invention of a milking parlor arrangement for at least one milking parlor for milking milk-producing animals, wherein the space divider is arranged on a longitudinal side of the milking parlor, comprises an arm device with a milking cluster which is adjustable out of a park position into an operating position and back. The arm device with the milking cluster is arranged in the space divider in the park position, wherein the milking cluster is adjustable into the operating position laterally with respect to the animal to be milked between the front and hind legs thereof, and wherein the milking cluster consists of two halves, wherein each half comprises a specific set of at least one teat cup.

In the case of a milking parlor arrangement with rectangular milking parlors which are arranged next to one another and in each case comprise parallel longitudinal sides, as is the case, for example, in a side-by-side arrangement, the space divider is arranged parallel to an imaginary longitudinal axis of the animal to be milked. In this case, it is assumed for the purposes of simplification that in an ideal state the animal to be milked with its imaginary longitudinal axis stands still during the milking operation.

In the case of a milking parlor arrangement with milking parlors that are arranged in a circular manner such as in the case of a rotary milking parlor, the longitudinal sides of the milking parlors are not parallel. In said case, the longitudinal sides are portions of radii of a circle of the rotary milking parlor and in the imaginary extension intersect in the center point of said circle or in the pivot point of the rotary milking parlor, thereby forming a center angle. The imaginary longitudinal axis of the animal to be milked also extends in the ideal case through the pivot point and halves the center angle. Here, said case is abbreviated further below by way of the term "approximately parallel".

An animal to be milked can enter the milking parlor which is provided with the space divider without coming into contact with the arm device. Not until the animal stands in the milking parlor is the milking cluster adjusted from the side in a positioning region into the operating position under the animal. For this purpose, it can be necessary during the flow of animals for the entire space divider to be moved out of an idle position into an ideal milking position for the new animal, for example in the longitudinal direction of the space divider. The space divider is designed such that there is no requirement for additional space. As a result, the advantage is produced whereby the animals are able to continue to stand belly to belly. This has further advantages: on the one hand, in this way many animals can be milked in the smallest possible space, as a result of which costs for the milking parlor arrangement and also for the associated building are able to be kept low. On the other hand, the distances to be covered by the milking staff and the animals remain shorter, i.e. time is saved.

With the adjusting of the arm device with the milking cluster from the side between the front legs and hind legs under the udder of the animal, the milking cluster is moved outside the region between the hind legs. In the region between the hind legs, there is a greatly increased risk of contamination by animal excrement. Said region is now avoided, which reduces contamination of the milking cluster and of the arm device in a considerable manner. As a result, cleaning times and consequently costs are also saved.

A further advantage of said compact method of construction is that it is possible to retrofit the space divider into existing installations without losing milking parlors/milking stalls.

Staff can intervene in the milking operation at any time and without being obstructed by devices, i.e. the support arm device and accessories, and have easy access. Additional protective devices are not necessary. If the milking parlor arrangement is a rotary milking parlor, it is able to maintain its rotation without interruption as the milking staff are able to intervene, for example, at certain places from the outside. Any danger to the milking staff is considerably reduced.

In one realization the arm device holds the milking cluster in the space divider in the park position. In this case, the arm device can comprise an upper arm and a lower arm which is coupled therewith, wherein the upper arm is realized as a holder and the lower arms forms a milking cluster carrier. The milking cluster carrier can hold two teat cups or even two teat cups on each side. The holding of the teat cups is advantageous for an automatic taking-hold process, e.g. by means of an external robot.

In a further realization, the arm device with the milking cluster is arranged in the space divider in the park position in openings of a cladding of the space divider. The milking cluster is consequently protected from external influences in the park position, for example as a result of an animal to be milked kicking.

In addition, the openings of the cladding of the space divider with the arm device with the milking cluster arranged therein in the park position are closable by way of a protective covering, as a result of which an even greater protective effect is achieved.

A cleaning device for the milking cluster is advantageously arranged in the space divider. Consequently, the teat cups cannot only be cleaned but also disinfected after each milking operation.

In yet another realization, the arm device is connected to a vertical drive which is arranged on the space divider and is provided for the vertical adjustment of the milking cluster for cleaning operations in cooperation with the cleaning device. As a result, a cleaning action of the teat cups can be made even stronger.

In addition, in another realization the space divider with its components can form a complete premounted unit, which can result in time savings in assembly.

A milking parlor arrangement for milking milk-producing animals comprises at least one above-described space divider.

In one realization, the milking parlor arrangement is a rotary milking parlor. In particular, it can be an external milking rotary parlor.

In a further realization, there is provided at least one external robot which is realized for positioning the milking cluster from the park position onto the teats of the udder of an animal to be milked. Consequently, an automatic milking operation is possible.

In yet another realization, it is provided that the at least one external robot comprises two base arms in each case with at least one hand, wherein the base arms and the hands are opposite one another, wherein the at least one external robot is realized for the parallel positioning of at least one teat cup per side on teats of an udder of the animal to be milked. In this case, the one base arm, by way of its hand on the left side of the animal to be milked (when viewed from behind), interacts with the teat cups of the milking cluster which is arranged in the space divider located on the left side, and the other opposite base arm, by way of its hand on the right side of the animal to be milked, interacts with the teat cups of the milking cluster which is arranged in the space divider located on the right side. As a result of such parallel positioning, a positioning operation per animal can be shortened considerably in time, as a result of which a greater throughput is able to be made possible. The term parallel positioning is to be understood as one teat cup being introduced and placed in position by the hand of the left base arm laterally from the left onto a left teat of the udder of the animal to be milked, and at the same time on the other side, i.e. parallel thereto, a teat cup is introduced and moved into position by the hand of the right base arm laterally from the right onto a right teat of the udder of the animal to be milked.

To this end, it is provided that the respective at least one hand is realized with at least one gripping portion for taking hold in each case of at least one teat cup in each case of one half of the milking clusters in the park position in a respective space divider to the left and right of an animal to be milked.

In another realization, at least one hand of the at least one external robot is provided with at least one positioning sensor. The positioning sensor can be, for example, a 3D camera which has sight of all four teats of the udder of the animal to be milked. Thus, it is possible that two robot arms are able to be controlled with only one camera.

The at least one external robot, with its two arms, enables short paths for positioning the teat cups. In one realization, it can also take hold of two teat cups per side at the same time, its movements being able to be reduced to a minimum.

Further advantages and details proceed from the exemplary embodiment shown in the figures of the drawing, in which:

FIG. 4 shows a schematic top view of a variant of the second exemplary embodiment according to FIGS. 2-2a;

Identical or similar operating elements are provided with identical references in the figures. A vertical direction z is specified in some figures.

Figure 1:
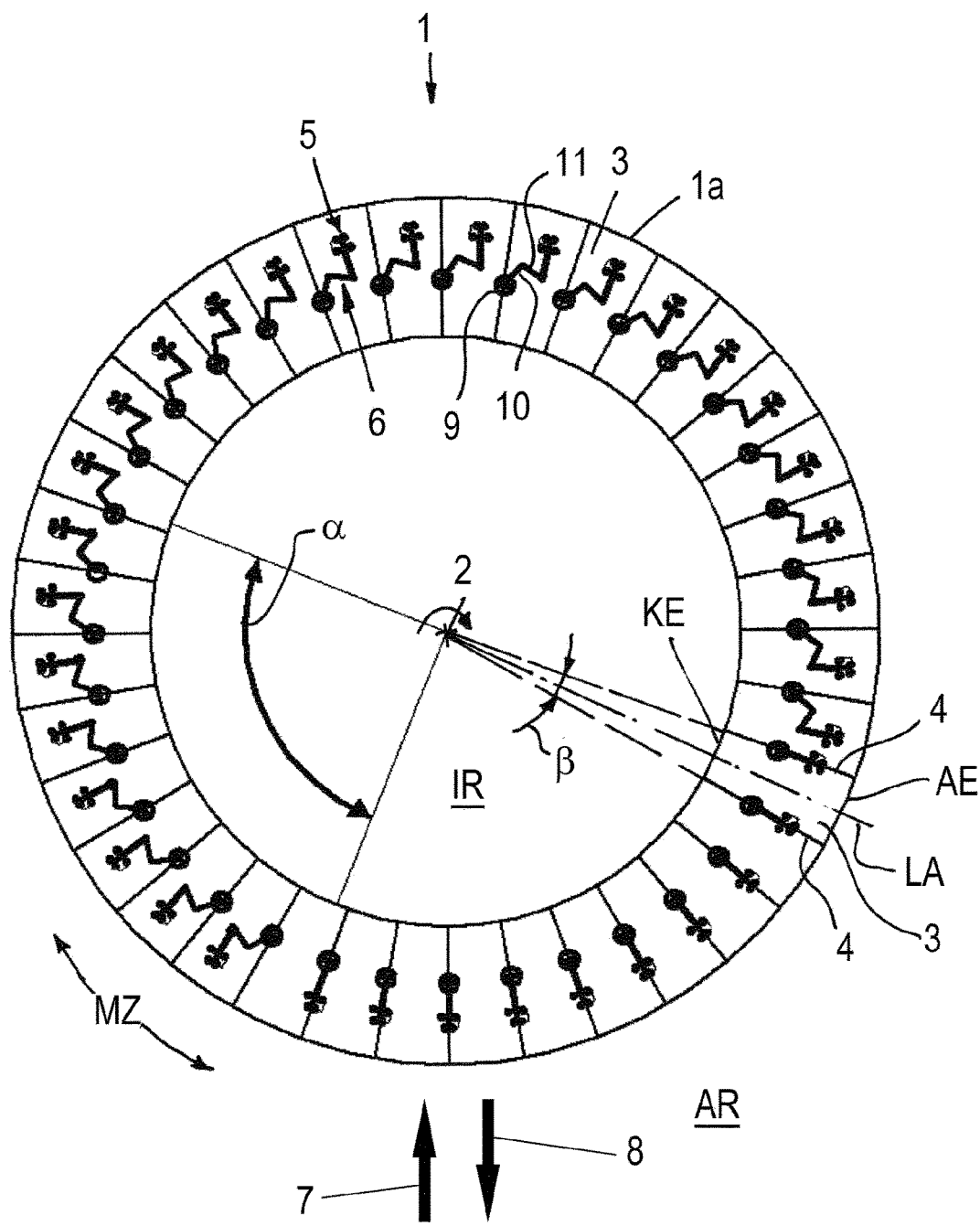
FIG. 1 shows a schematic top view of a first exemplary embodiment of a milking parlor arrangement according to the invention.

FIG. 1 shows a schematic top view of a first exemplary embodiment of a milking parlor arrangement 1 according to the invention with space dividers 4 according to the invention.

The milking parlor arrangement 1 is constructed in the manner of a so-called external rotary milking parlor with a ring-shaped milking platform 1a. In this case, the animals to be milked stand with their heads aligned toward a center, i.e. a pivot point 2 which is situated in an interior IE of the milking parlor arrangement 1. The rotary parlor, in this case, is rotatable in a clockwise manner about the pivot point 2. Naturally, the rotary parlor can also be rotatable in an anticlockwise direction in another realization. In said example, thirty six milking parlors 3 are arranged on the circumference of the rotary parlor and are separated by space dividers 4.

Each milking parlor 3 in said carousel is a segment of a circle with a center angle β between two imaginary extensions of the longitudinal axes of the space dividers 4 defining the milking parlor at the side and comprises a longitudinal axis LA which is the angle bisector of the center angle β. Each milking parlor 3, in this case, comprises an inside end IE which is also designated as the head end, and an outside end AE which points to an exterior AR of the milking parlor arrangement 1.

The space dividers 4 are aligned approximately parallel to an imaginary longitudinal axis of an animal to be milked which stands on a milking parlor 3, it being assumed that the imaginary longitudinal axis of the animal to be milked and standing quietly extends in the direction of the longitudinal axis of the milking parlor 3. The milking parlor arrangement 1 is used for the mechanical milking of milk-producing animals, e.g. cows, by means of milking clusters 5. In each case at least one milking cluster 5, which is adjustable from a park position into an operating position under the udder of an animal to be milked, e.g. a cow, in each milking parlor 3 by means of an arm device 6, e.g. with an upper arm 10 and a lower arm 11, is provided for each milking parlor 3. Each milking cluster 5 is arranged with the arm device 6 inside a space divider 4 in the park position.

The animals can enter the rotary parlor by means of an entry 7 and leave by means of an exit 8. A control cabinet unit 12, which defines the respective milking parlor 3 toward the interior IR for an animal to be milked such that said animal is not able to move into the interior IR, is arranged on/at the inside end IE of each milking parlor 3 between the respective ends of the space dividers 4. The switching cabinet unit 12 will be described in more detail below.

Once an animal has entered a milking parlor 3, it is important that the animal takes up a predefined position. This is achieved by the space dividers 4 together with the respective control cabinet unit 12 forming an enclosed milking parlor 3. When the animal stands in the milking parlor 3, in a preferred manner inside a segment of a circle which, in this case, is designated as a positioning region α, the milking cluster 5 is adjusted out of the park position in the space divider 4 into the operating position from the side of the animal between its front legs and hind legs under the udder of the animal and is positioned thereon by means of a positioning sensor 16 (see FIGS. 9, 10). However, in principle, positioning is possible in any position of the rotary parlor, e.g. if a milking cluster has dropped off again. In the first exemplary embodiment of the space dividers 4, a drive unit 9, which is connected to the arm device 6, is arranged on each space divider 4. Once the milking operation has been concluded, the milking cluster 5 is removed again from the animal to be milked by means of the arm device 6 and drive unit 9 or drops off itself into a standby position or end-of-milking position and is then adjusted into the park position.

On the outer circumference of the milking parlor arrangement 1 all the milking parlors 3 are freely accessible by a milker in a milker access MZ in an exterior AR such that he is able to intervene in a milking operation at any time. Said operating region is consequently kept free of additional devices. Risk to a milker is minimized. The rotary milking parlor can remain constantly in rotation, even the interior IR of such a milking arrangement/such a milking system is accessible to a supervisor at any time without any risk to said person.

The milking cluster 5 is moved laterally to the animal to be milked in the milking parlor 3 and is positioned from the side of the animal under its udder.

The arm device 6 comprises an upper arm 10 and a lower arm 11 and its function is to support the milking cluster 5 so as to balance the weight and to be smooth-running such that it follows the movements of the animal to be milked.

The arm device 6 can be realized in different variations. A possible realization is explained below in conjunction with FIGS. 5 and 8.

Figure 2:
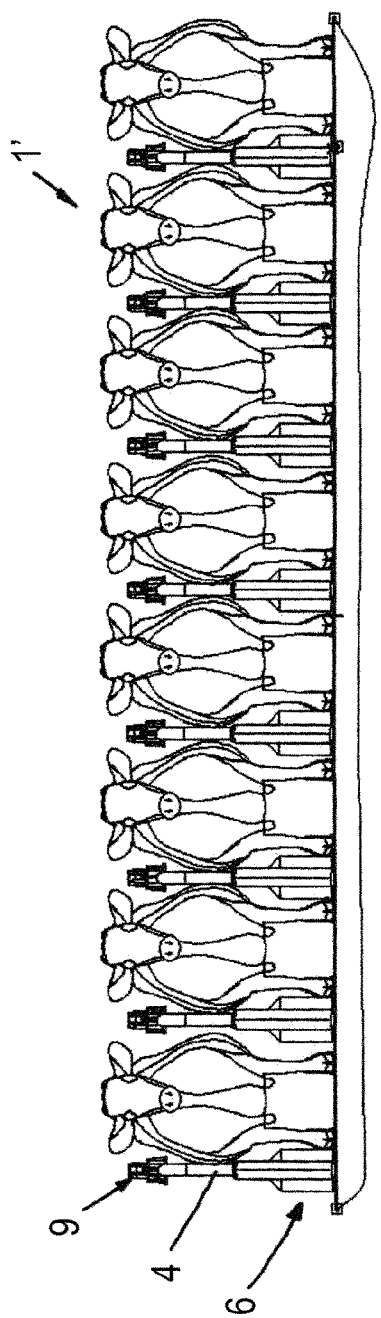
FIG. 2 shows a schematic front view of a second exemplary embodiment of the milking parlor arrangement according to the invention.
Figure 2A:
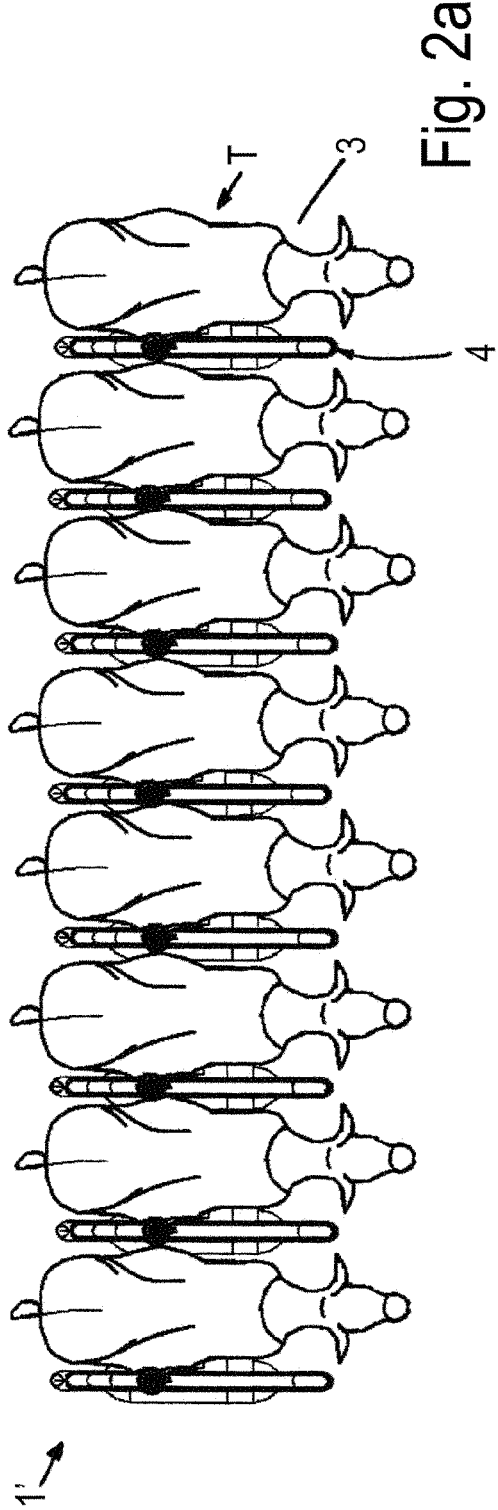
FIG. 2a shows a schematic top view of the second exemplary embodiment of the milking parlor arrangement according to the invention.

FIGS. 2 and 2*a* show schematic views of a second exemplary embodiment of the milking parlor arrangement 1' according to the invention with the space dividers 4 according to the invention. FIG. 2 shows a front view and FIG. 2*a* provides a top view. In this case, the milking parlors 3 are arranged side by side and are also separated by space dividers 4. Animals T to be milked, which in this case are cows, are situated in the milking parlors 3. A drive unit 9 in each case for one arm device 6 is arranged with the milking cluster 5 on each space divider 4.

Figure 3:
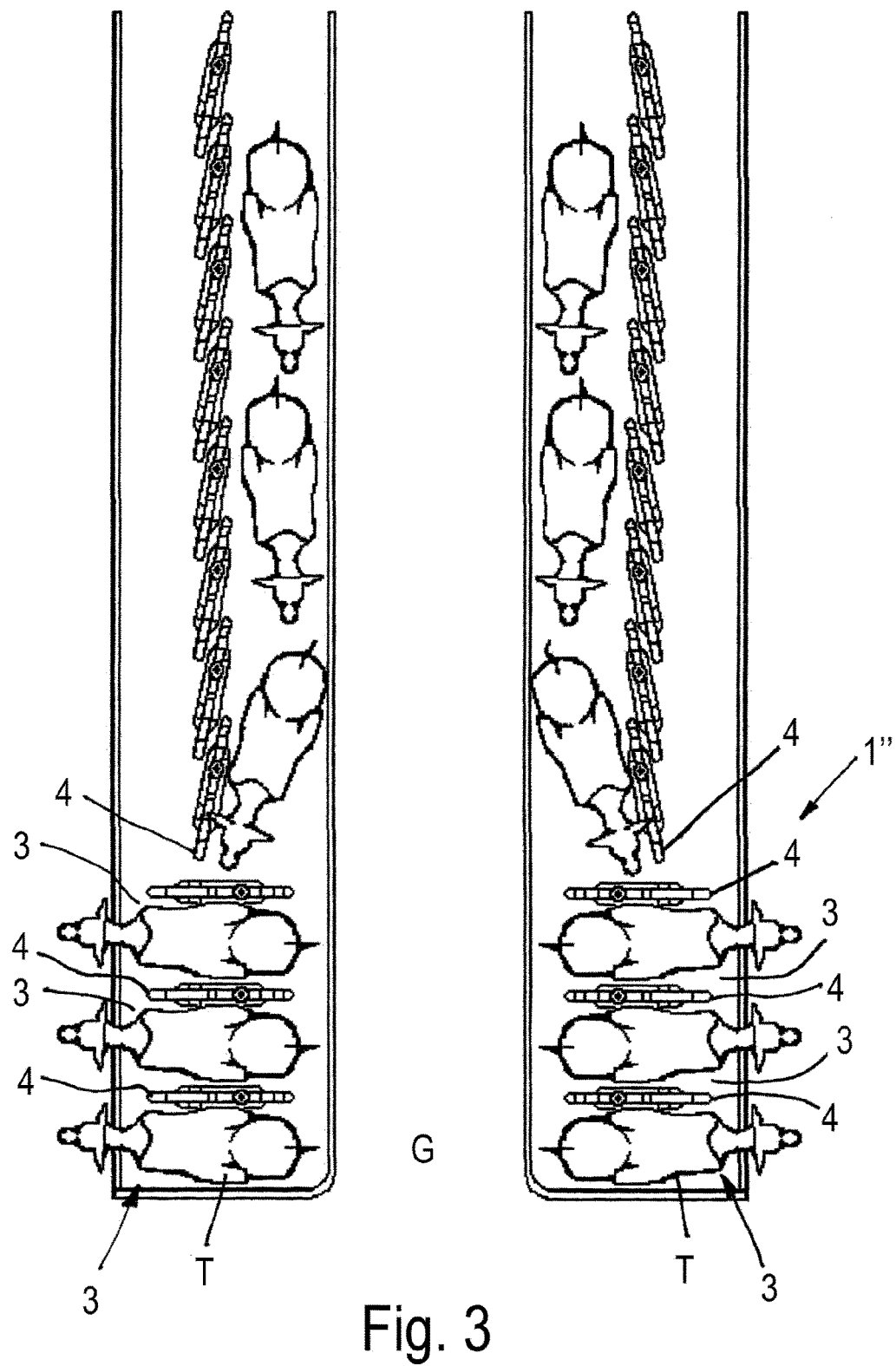
FIG. 3 shows a schematic top view of a third exemplary embodiment of the milking parlor arrangement according to the invention.

FIG. 3 shows a schematic top view of a third exemplary embodiment of the milking parlor arrangement 1" with the space dividers 4 and the control cabinet units. In said third exemplary embodiment, the space dividers 4 are arranged so as to be pivotable in a U-shaped passageway, initially forming a passage by being pivoted in a line and guiding the animals T. As soon as the first animal has arrived at the end of the U-shaped passageway, the space divider that is first on the left in FIG. 3 pivots in an anticlockwise manner such that a milking parlor 3 is formed. The pivoting can be effected either in a controlled manner by means of a rotary actuator or automatically as a result of the movement of the animal T. Said operations run until all the animals are placed in the milking parlor arrangement 1". Here too, a drive unit 9 in each case for one arm device 6 is arranged with the milking cluster 5 on each space divider 4.

In this case, two U-shaped passageways, which are separated by a so-called pit G, are arranged in a mirror-symmetrical manner. The pit G is the space occupied by a milker who, from here, monitors the milking on both sides and is able to intervene in a helping manner without being obstructed by the movement of the arm devices 6.

The space dividers 4 in said exemplary embodiment are parallel to one another and to an imaginary longitudinal axis of an animal T standing quietly.

Figure 4:
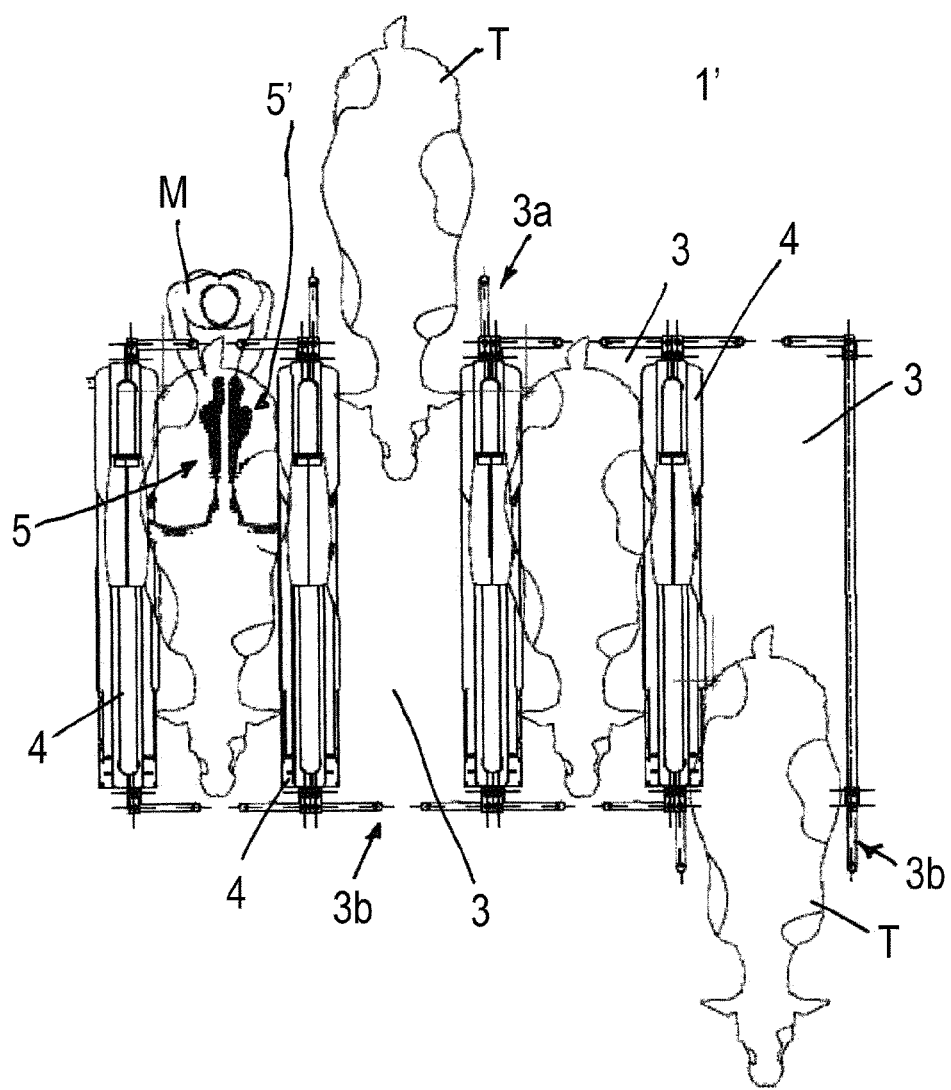

FIG. 4 shows a schematic top view of a variant of the second exemplary embodiment according to FIGS. 2-2*a*. Said variant is also designated as a drive-through milking parlor arrangement 1'. The milking parlors 3 are separated laterally by the space dividers 4. Gates 3*a*, 3*b* are arranged in each case on the narrow rear sides and front sides of the milking parlors 3, the gates 3*a* on the rear sides being open in order to form an entry for an animal T into the milking parlor 3 (second milking parlor 3 on the left in FIG. 27). The animal T cannot move out at the front side as it is closed by the gates 3*b*. If an animal T is situated fully in the milking parlor 3, the gates 3*a* of the rear side are closed (first and third milking parlor 3 on the left in FIG. 28). Once the milking operation is completed, the gates 3*b* of the front side are opened, and the animals T are able to leave the milking parlor 3 again, as is shown in the case of the fourth milking parlor 3 on the left in FIG. 28.

With the milking parlor 3 closed with an animal situated therein, the milker M is able to position the milking cluster 5, 5' or is able to check the automatically positioned milking cluster 5, 5' and, where applicable, re-position a milking cluster 5, 5' that has dropped off. The milking cluster 5, 5', in said realization, is in two parts, one half of the milking cluster 5 being received in the one left-hand space divider 4 and the other half of the milking cluster 5' being received in the one right-hand space divider 4. This will be described in more detail below.

Figure 5:
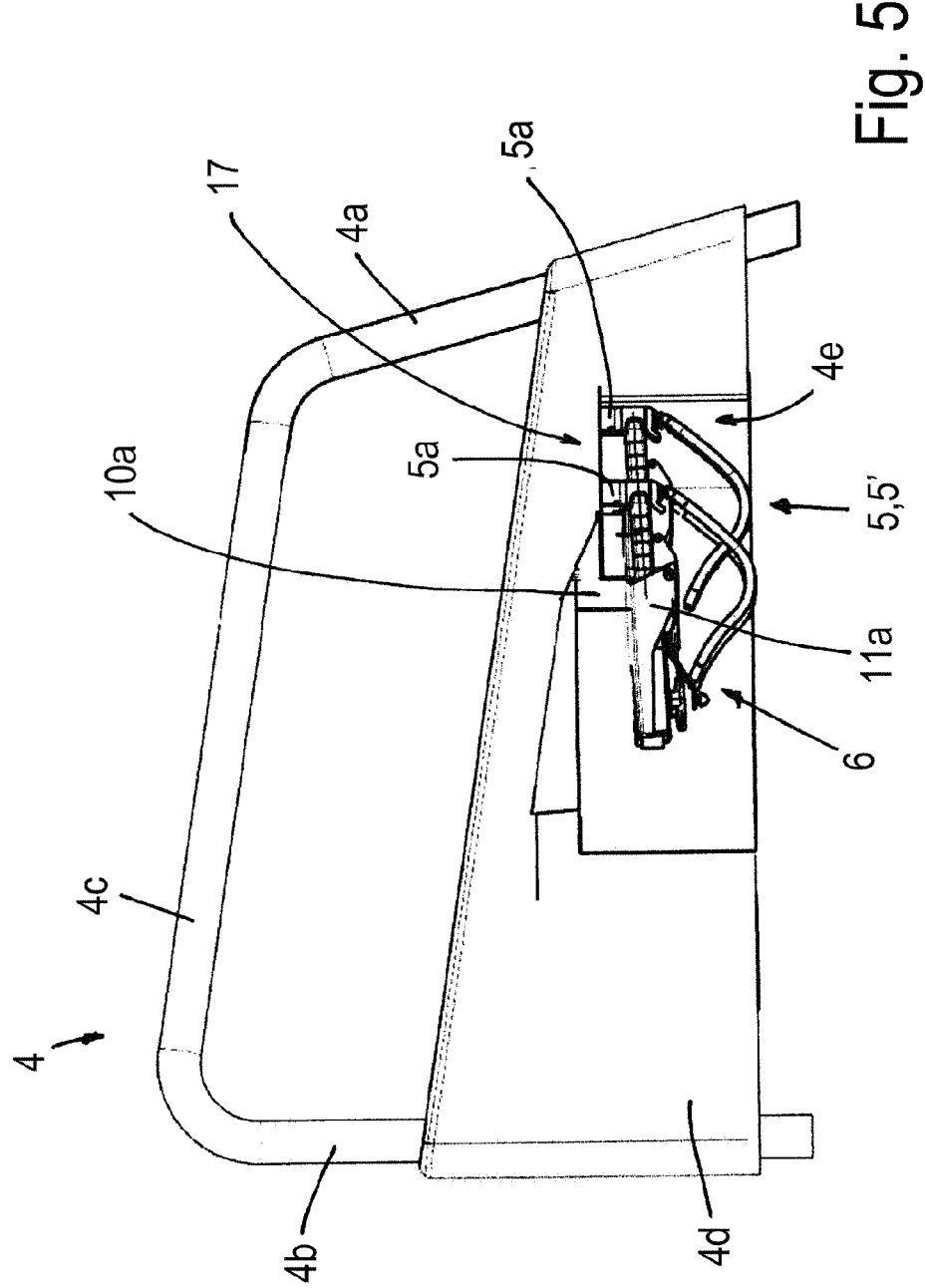
FIG. 5 shows a side view of the space divider according to the invention.
Figure 6:
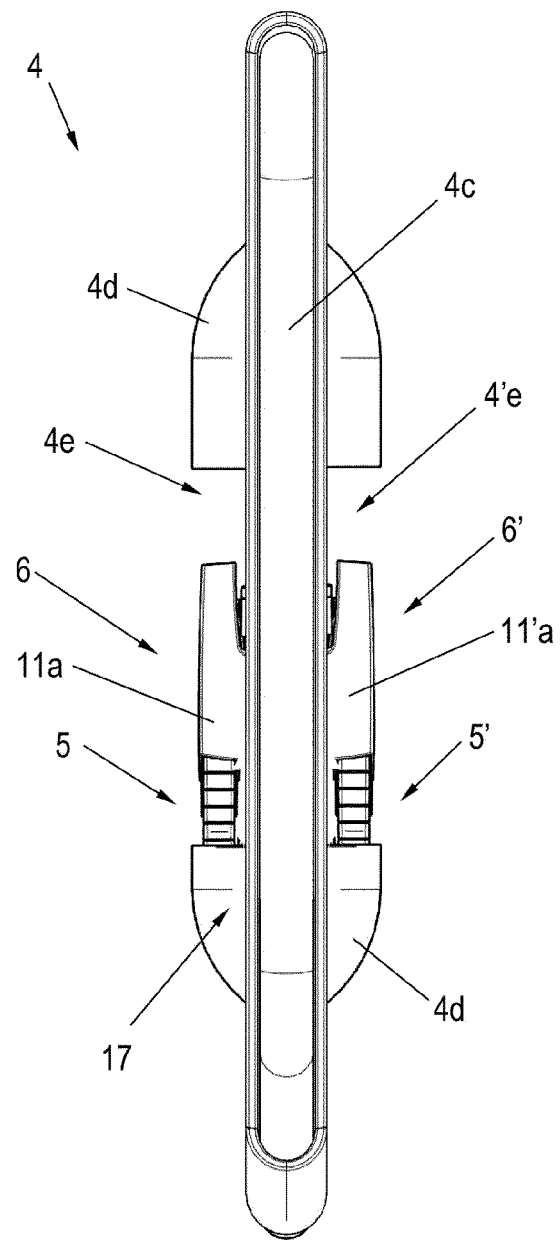
FIGS. 6 and 7 show a top view and bottom view of the space divider according to the invention with the arm device in the park position.

FIG. 5 shows a side view of the space divider 4 according to the invention with the arm device 6 and the milking cluster 5, 5' in the park position. FIG. 6 shows a top view of the space divider according to the invention with the arm device 6 in the park position, and figure shows it in a view from below without a milking cluster 5, 5' or arm device 6.

The space divider 4, in this case, is realized as a housing in which the arm device 6 and the milking cluster 5, 5' are also arranged. The space divider 4 is thus a complete unit which can be premounted at a given point and which is completely interchangeable or can subsequently be fitted in retro.

The space divider 4, in this case, is developed as a tubular structure with a front post 4a which is slightly inclined, and a rear post 4b. The posts 4a, 4b are connected by means of a horizontally extending horizontal bar 4c. At approximately half-height, the posts 4a, 4b are enveloped by a cladding 4d which extends approximately down to the feet of the posts 4a, 4b. The posts 4a, 4b and the horizontal bar 4c can also be produced integrally from bent tube. An opening 4e is made in the cladding 4d in the front half on both sides, as a result of which a receiving means is produced in the cladding 4d inside the space divider 4 which receiving means can also be bulging toward the sides such that it receives and surrounds the milking cluster 5, 5' parked therein. An additional protective covering (not shown) can be attached on the side of the opening 4e for the protection of the milking cluster 5, 5'. Said protective covering can be displaced during the activation of the milking cluster 5, 5', e.g. in the direction of the space divider 4 in order to expose the opening 4e. In a further realization, the protective covering can also be attached on the milking cluster 5, 5'. Thus, the protective covering remains fixed on the milking cluster 5, 5' and also moves with said milking cluster. It can also be made smaller in the operating position, e.g. as a result of collapsing or telescoping automatically.

The milking cluster 5, 5' consists of two halves each with two teat cups 5a and is attached on the lower arm 11 of the arm device 6 which, in this case, is realized as a milking cluster carrier 11a. Each of the milking clusters 5, 5' comprises two teat cups 5a in said exemplary embodiment. Each of the four teat cups 5a is able to assume a different position independently from the others and can be automatically fixed or switched so as to be freely movable. Consequently, the teat cups 5a are able to assume individual positions in the positioned state as the teat cups 5a are placed in position individually. In addition, individual teat cup pre-positioning (not shown) is conceivable by means of which several teat cups can then be positioned at the same time.

The milking cluster carrier 11a is held on a holder 10a in the space divider 4. The milking cluster carrier 11a and the holder 10a are not shown in any more detail.

It can be seen in FIG. 6 that on each side of the space divider 4 a receiving means 4e, 4'e is realized for an arm device 6, 6' with a milking cluster carrier 11, 11'a. The milking cluster carriers 6, 6' can also be realized as a complete part. A cleaning device 17, which is provided with four cleaning nozzles for the four teat cups 5a of the two half milking clusters 5, 5' in FIG. 7, is attached below the cladding 4d.

In the park position of the milking cluster 5 and of the arm device 6 inside the cladding 4d of the space divider 4, the milking cluster 5 is below the cleaning device 17 and is in contact with it.

Figure 7:
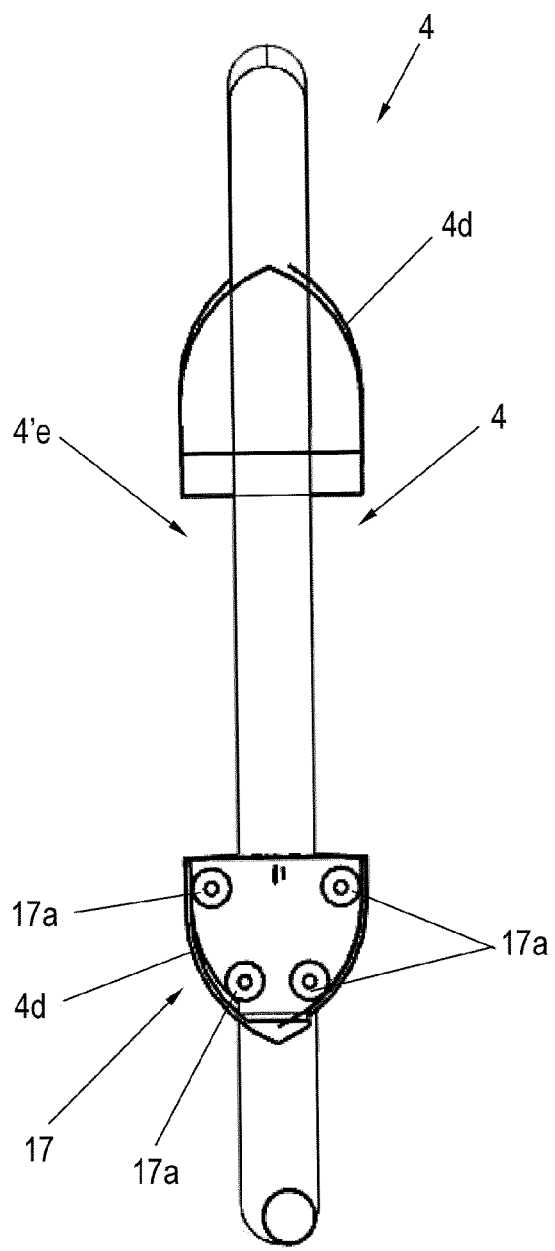

In a bottom view of the space divider 4, FIG. 7 shows the cleaning device 17 with cleaning nozzles 17a. When the milking cluster 5 assumes the park position, said position is at the same time a so-called clean(ing)-in-place (CIP) position. By means of a vertical drive (not shown) via the holder 10a of the arm device 6, 6', the milking cluster carrier 11a, 11'a with the milking cluster 5, 5' can be adjusted upward in the vertical direction and also back again until the cleaning nozzles 17a interact in each case with a teat cup 5a of the milking cluster 5 in order to clean it with a cleaning liquid. The cleaning nozzles 17a can also be charged with air in order to dry the teat cups after cleaning. It is also possible that the vertical drive moves the milking cluster 5, 5' and consequently the teat cups 5a up and down in the vertical direction by a certain distance, the cleaning nozzles 17a being able to clean inside the teat cups 5a for example. The cleaning nozzles 17a can be realized in a corresponding manner for this purpose, e.g. as cone jet spray nozzles and/or radial jet spray nozzles. In addition to the cleaning nozzles 17a, in a specific development, external cleaning nozzles (not shown here) can also clean the teat cups 5a on the outside. A disinfection can also be effected additionally.

Figure 8:
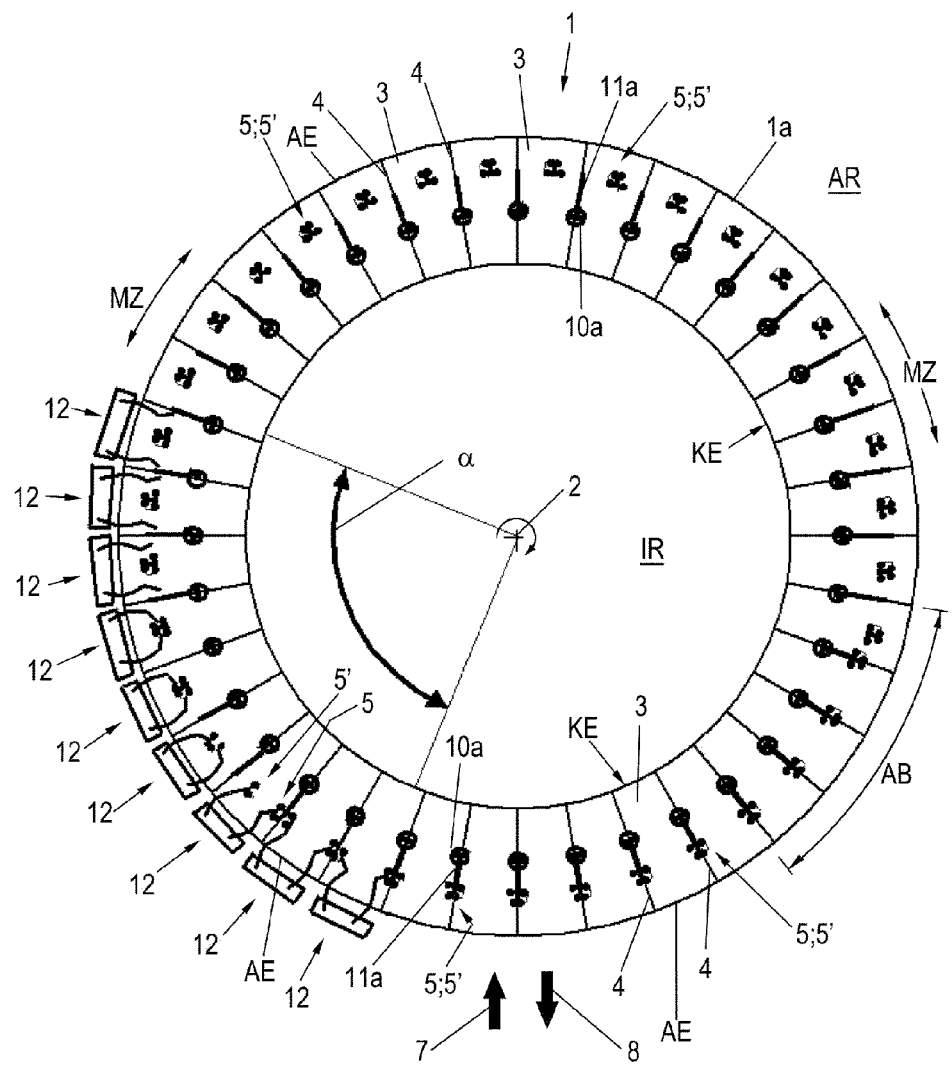
FIG. 8 shows a schematic top view of a variant of the first exemplary embodiment according to FIG. 1.

FIG. 8 shows a schematic top view of a variant of the first exemplary embodiment according to FIG. 1.

In contrast to the first exemplary embodiment according to FIG. 1, in this case so-called external robots 12, which perform the positioning operation of the teat cups 5a of the milking clusters 5, 5' inside the positioning region α, are arranged in the exterior AR inside the positioning region α. There can be, for example, only one exterior robot 12 present which is moved toward the outside end AE of a milking parlor 3 of the milking platform 1a at the start of the positioning region α and then takes hold of the teat cups 5a of the milking clusters 5, 5' parked in the space dividers 4 and positions them onto the teats of the udder of an animal to be milked. As soon as said operation has been carried out, the positioning operation is carried out for the next animal. In this case, several external robots 12 are shown which are able to carry out said operations at the same time, the throughput speed being increased.

The external robots 12 can also be arranged in a removal region AB for the removal of the positioned teat cups 5a of the milking clusters 5, 5' and the adjustment of the same into the park positions in the space dividers 4. It is also possible that they are able to move there on rails (not shown). In another realization, the external robots 12 can also be moved in the entire exterior AR on the outside edge of the milking platform 1a.

Figure 9:
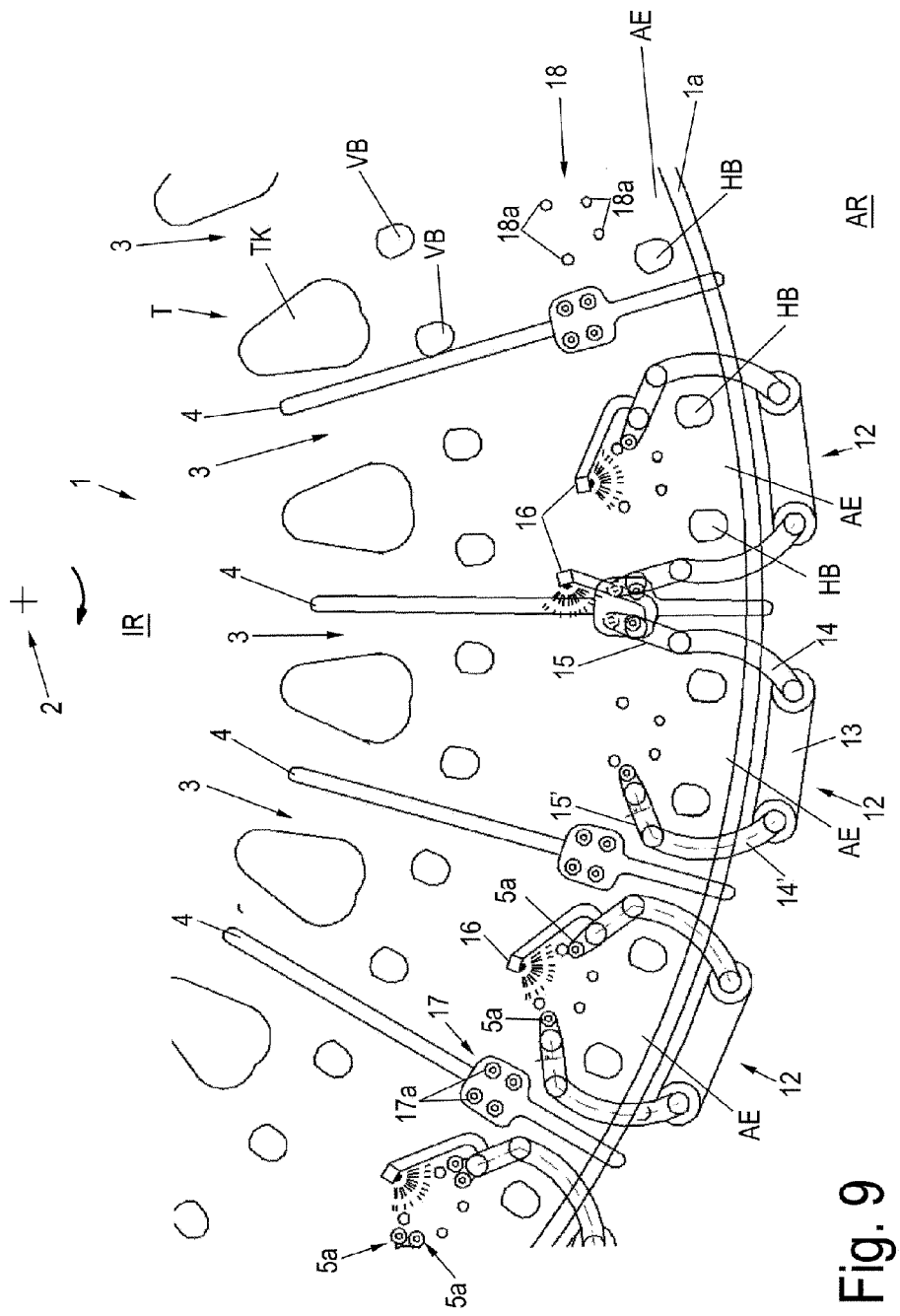
FIG. 9 shows an enlarged part top view of the variant of the first exemplary embodiment according to FIG. 8.
Figure 10:
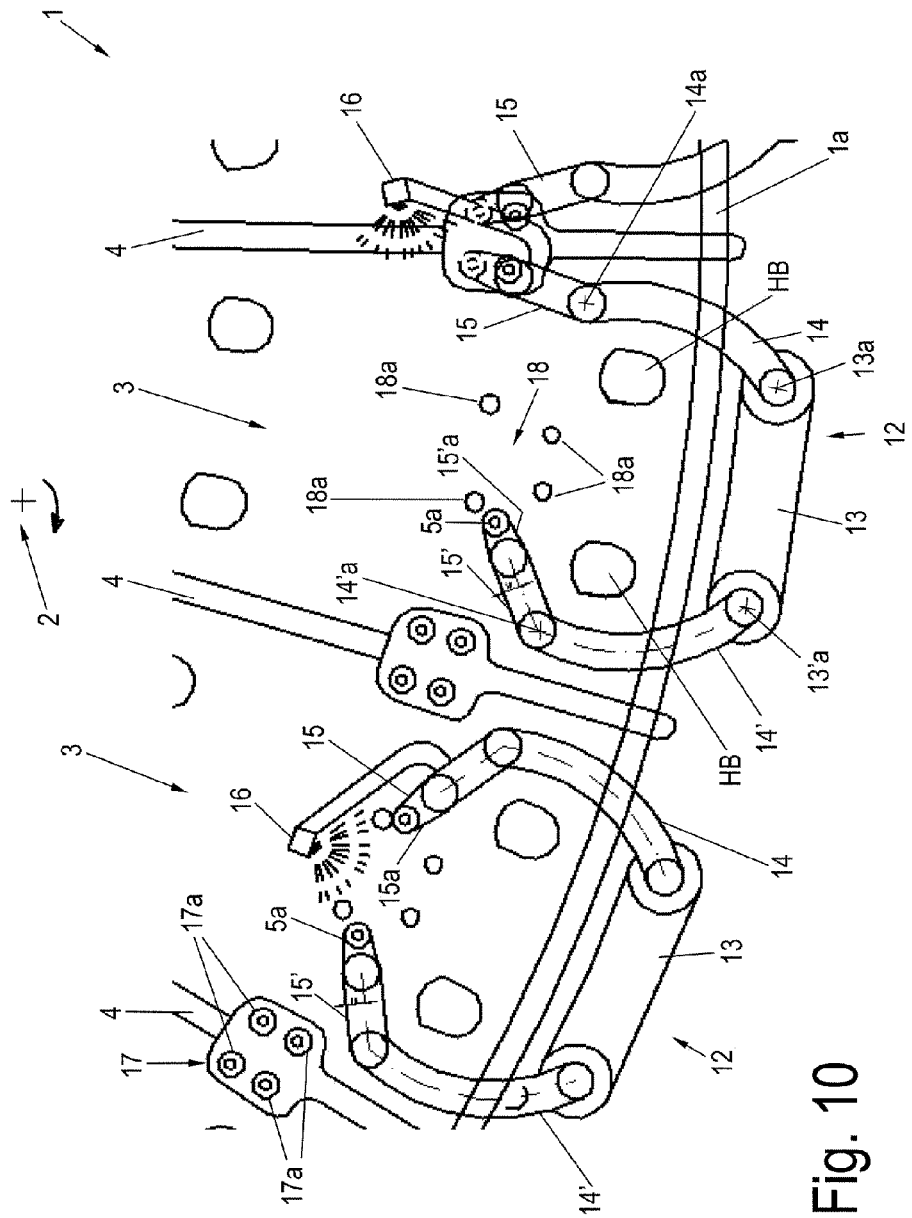
FIG. 10 shows an enlarged detail of the variant according to FIG. 9.

To this end, FIG. 9 shows an enlarged part top view of the variant of the first exemplary embodiment according to FIG. 8. FIG. 10 shows an enlarged detail of the variant according to FIG. 9.

The animals T to be milked are only indicated schematically by their front legs VB, hind legs HB and animal heads TK in FIGS. 9 and 10.

The external robot 12 comprises a robot base 13, two base arms 14, 14' and two hands 15, 15' with gripping portions 15a, 15'a. The base arms 14, 14' are bent, their curvature pointing to the outside, and are arranged in a mirror-symmetrical manner. One end of each of the base arms 14, 14' is mounted in a base joint 13a, 13'a on the robot base 13 so as to be pivotable about a vertical pivot axis. The hands 15, 15' are fastened as short straight arms in each case with one end in hand joints 14a, 14'a on the free ends of the base arms 14, 14' in each case so as to be pivotable about a vertical pivot axis. The free ends of the hands 15, 15' are provided with gripping portions 15a, 15'a which are realized for the purpose of taking hold of the teat cups 5a, 5'a of the milking clusters 5, 5' in the respective space divider 4 in the park position, positioning them on teats 18a of the udder 18 of the animal T to be milked, removing them again and positioning them back into the park position in the respective space divider 4.

Each external robot 12 is arranged with its arms 14, 14' and hands 15, 15' in the manner of a humanoid robot in the rotary parlor behind the animals T to be milked on the outside end AE of the milking parlors 3.

A positioning sensor 16 with a 3D camera, which has sight of the entire udder 18 with the teats 18a during the positioning process, is arranged on one of the two hands 15, 15', in this case on the right hand 15. It is possible in this case for the two base arms 14, 14' and hands 15,15' of the exterior robot 12 to be operable or controllable with only one camera.

Thus, both base arms 14, 14' with the hands 15, 15' can position the teat cups 5a of the milking clusters 5, 5' on the teats 18a of the udder 18 of the animal T to be milked in parallel laterally from the outside of the animal T to be milked from the left and from the right between the hind legs HB and front legs VB. In comparison to a positioning operation for four teat cups 5a from one side, such a positioning operation is twice as quick.

The base arms 14, 14' with the hands 15, 15', preferably from the outward side of the animal T to be milked, grasp the teat cups 5a from the space divider 4 below the cleaning device 17 and position them onto the teats 18a. The advantage of this is that the teat cups 5a are guided under the animal T to be milked in a region that is protected from feces. In addition, the freedom of movement of the base arms 14, 14' with the hands 15, 15' is greater than when they were guided through the hind legs HB in the longitudinal direction of the animal T to be milked, which is a problem for reasons of space.

The teat cups 5a can be taken hold of individually or also in twos. FIG. 9 shows two teat cups 5a being taken hold of at the same time as an example.

Drives of the base arms 14, 14' are arranged in the robot base 13. The hands 15, 15' can be pivoted by means of parallel guides or they are movable independently individually. A control unit of the external robot 12 can be arranged in the robot base 13 and communicates with the control unit of the milking parlor arrangement 1. Obviously, corresponding sensors are arranged which support precise positioning of each of the exterior robots 12 on the milking platform 1a or on a respective milking parlor 3.

The invention is not restricted to the exemplary embodiments shown above but is modifiable within the accompanying claims.

Thus, it is, for example, conceivable that in the case of the second exemplary embodiment of the milking parlor arrangement 1' according to the invention according to FIG. 2, several rows of milking parlors arranged side by side can be arranged one behind another or even also one above another on several floors.

In a further realization each milking parlor 3 can be provided with an external robot 12.

In an extension, the positioning sensor 16 can also supply, for example, images concerning the state of the udder of the animal to be milked and consequently contribute to the knowledge of the health of the animal to be milked.

Each milking parlor 3 can be activated or blocked per se. The milking parlor arrangement 1 can continue to be operated even with some milking parlors 3 blocked, e.g. it is not necessary to stop the rotary milking parlor.

Each milking parlor 3 can be prepared individually for an animal, e.g. different predefined pre-positions of the milking cluster 5 with the arm device 6, or also individual displacement of the space divider 4 in the longitudinal axis for finding the most favorable milking and outlet position for the respective animal. In the case of the semi-automatic version, the pre-position of the milking cluster 5 can be automatically adapted to the animal expected in the respective milking parlor 3 when a recognition device (e.g. RFID) detects the respective animal that enters the milking parlor 3. In addition, it can be possible in the case of a recognized animal for a pre-positioning of the teat cups 5a to be able to be adapted to the udder dimensions of the recognized animal.

In addition, each milking parlor 3 can have a feeding device.

The milking cluster can naturally also be used for milk-producing animals with udders which have a different number of teats, e.g. 2, 3 or 4.

An external robot 12, which operates one milking parlor after another, can be positioned in place of the milker M in the case of the milking parlor arrangement 1' according to FIG. 4.

The milking parlor arrangement 1 as a rotary milking parlor can be realized such that several 360° rotations for one milking operation of a certain animal can also be effected if this is necessary. In this case, an animal is prevented from leaving the milking parlor 3 when it arrives at the exit 8.

LIST OF REFERENCES 1, 1', 1" Milking parlor arrangement
1a Milking platform
2 Pivot point
3 Milking parlor
3a, 3b Gate
4 Space divider
4a, 4b Posts
4c Horizontal bar
4d Cladding
4e, 4'e Receiving means
5, 5' Milking cluster
5a Teat cup
6, 6' Arm device
7 Entry
8 Exit
9 Drive unit
10 Upper arm
10a Holder
11 Lower arm
11a, 11'a Milking cluster carrier
12 External robot
13 Robot base
13a, 13'a Base joint
14, 14' Base arm
14a, 14'a Hand joint 15, 15' Hand
15a, 15'a Gripping portion
16 Positioning sensor
17 Cleaning device
17a Cleaning nozzle
18 Udder
18a Teat
α Positioning region
β Center angle
AE Outside end
AR Exterior
G Pit
KE Head end
HB Hind leg
IR Interior
LA Longitudinal axis
Milker
MZ Milker access
T Animal
TK Animal head
VB Front leg

The invention claimed is:

1. A space divider of a milking parlor arrangement for a milking parlor for milking milk-producing animals wherein the space divider comprises:
   an arm device for movement between a park position and an operating position wherein the arm device is arranged in the space divider in the park position, and moves laterally into the operating position; and
   a milking cluster supported by the arm device and including two portions and each portion includes a teat cup;
   wherein the arm device is arranged in an opening in the space divider in the park position; and
   wherein the opening of the space divider is closable by a protective covering.

2. The space divider of claim 1, wherein the arm device supports the milking cluster in the space divider in the park position.

3. The space divider of claim 1, wherein the arm device comprises an upper arm and a lower arm coupled to the upper arm, wherein the upper arm supports the lower arm, and the lower arm includes a milk cluster carrier.

4. The space divider of claim 1, and further comprising:
   a milking cluster cleaning device arranged in the space divider.

5. The space divider of claim 4, and further comprising:
   a vertical drive for adjusting the milking cluster into a cleaning position.

6. The space divider of claim 1, wherein the space divider and arm device are assembled as a unit and having connectors for being mounted to a milking parlor.

7. A milking parlor for milking milk-producing animals, the milking parlor arrangement having a space divider comprising:
   an arm device for supporting a milking cluster between a park position arranged in the space divider, and laterally into an operating position;
   a milking cluster including two portions and each portion includes a teat cup; and
   an external robot for adjusting the milking cluster between the park position and a milking position;
   wherein the external robot comprises:
      two base arms and a hand joined to each base arm, wherein the base arms are opposite one another, and wherein the external robot is controllable for parallel positioning of at least one teat cup per side on a teat of an udder of an animal to be milked.

8. The milking parlor of claim 7, wherein the milking parlor is a rotary milking parlor.

9. The milking parlor arrangement of claim 8, wherein the rotary milking parlor is an external rotary milking parlor.

10. The milking parlor arrangement of claim 7, wherein the hand includes a teat cup gripping portion engaged with the teat cup when in the park position.

11. The milking parlor of claim 7, wherein the hand of the external robot further comprises:
    a positioning sensor.

12. The space divider of claim 7, wherein the opening of the space divider is closable by a protective covering.

\* \* \* \* \*